No. 799,638. PATENTED SEPT. 19, 1905.
A. DUCASBLE.
RESILIENT TIRE FOR ROAD WHEELS.
APPLICATION FILED SEPT. 8, 1904.

Witnesses
A. M. Tanner
Edward Sarton

Inventor
Alfred Ducasble
By Spear Middleton Donaldson & Spear
Attys.

UNITED STATES PATENT OFFICE.

ALFRED DUCASBLE, OF NEUILLY, FRANCE.

RESILIENT TIRE FOR ROAD-WHEELS.

No. 799,638.  Specification of Letters Patent.  Patented Sept. 19, 1905.

Application filed September 8, 1904. Serial No. 223,757.

*To all whom it may concern:*

Be it known that I, ALFRED DUCASBLE, engineer, a citizen of the French Republic, residing at 22 Rue Montrosier, Neuilly, Seine, France, have invented certain new and useful Improvements in and Relating to Resilient Tires for Road-Wheels, of which the following is a specification.

My invention relates to improvements in cellular tires for the wheels of road-vehicles.

The object of my invention is to provide an improved cellular resilient tire.

My invention consists in an improved cushion-tire in which no outer cover or envelop is required, the tire having formed within it a series of hollow chambers which are isolated from one another, but are always in free and direct communication with the atmosphere through small holes in the walls of the tire, whereby a change of air takes place in every chamber at each revolution of the wheel.

My invention further consists in a cushion-tire of rubber or the like formed into a number of sections by cross-grooves of concave or other suitable form on the periphery of the tire, each section having within it a chamber open to atmosphere only through a small hole or port, whereby some of the air in each chamber is forced out during the short time in which the corresponding segment is in engagement with the road and fresh air is again drawn in when the pressure on the segments is released.

Figure 1:
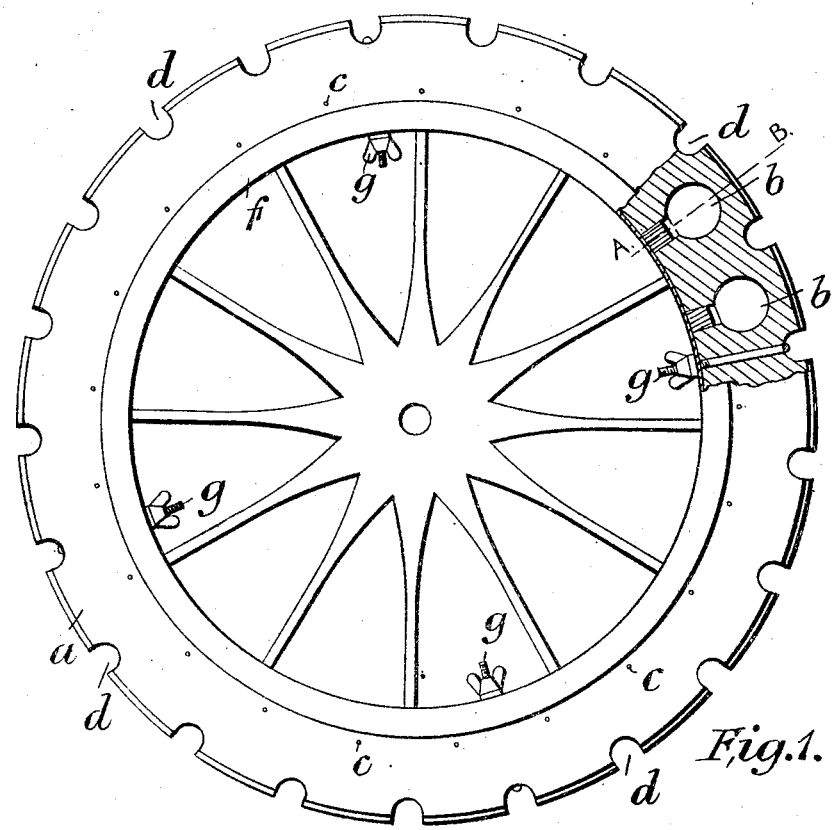
Figures 2, 4:
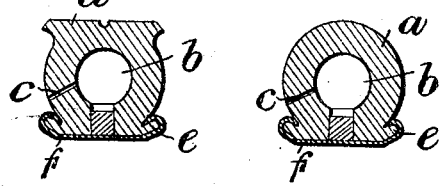
Figure 3:

Referring now to the accompanying drawings, Figure 1 is a partly-sectional elevation of a wheel provided with a tire constructed according to the present invention. Fig. 2 is a section on the line A B of Fig. 1. Fig. 3 is a detail of the fixing-bolt which I use. Fig. 4 is a similar section to Fig. 2 through a modified form of the invention.

In carrying the invention into effect according to the form illustrated in Figs. 1 and 2 the tire $a$ is constructed of rubber and is provided with chambers $b$, shown in the sectional part of Fig. 1, from which it will be seen that they are of practically spherical form. Each of these chambers is in communication with the atmosphere through the small holes $c$ in the walls of the tire. At the periphery there are grooves $d$, formed between each of the chambers $b$. These grooves may be arranged straight, as shown in the figures, or in skew form.

The tread-surface of the tire may be flat, as shown in Figs. 1 and 2, or round, as shown in Fig. 4. In practice I prefer to use the flat form, which is best adapted for the prevention of skidding or slipping.

The tire may be bound to the rim by the projections $e$, which engage with the gripping parts $f$ in the felly, and still greater security may be obtained by inserting a number of T-headed bolts $g$ of the form shown in Fig 3 and which pass through the tire and felly and may have their heads nested in the grooves $d$.

When the segments into which the wheel is divided by the grooves $d$ come into contact with the ground, some of the air in the corresponding chamber $b$ is expelled. When the segment is released from the superimposed load, the resilient rubber springs back to its original form, and fresh air is drawn in. In this way the wheel is kept cool by the ingression of air at each revolution.

By providing grooves $d$ the air in the chamber in that segment which is in contact with the ground is alone being expelled at any instant, since the grooves $d$ allow the chamber to expand in a circumferential direction, while the tire is perfectly free to expand in a direction at right angles. It will be seen then that the time in which air is being expelled is very brief, and the small hole is insufficient to allow any great quantity of air to escape, and consequently the effect of a pneumatic tire is obtained without its defects. The grooves $d$ also prove most effective in preventing skidding or slipping, while the simplicity of construction of a tire according to my invention and its freedom from valves are advantages which will be readily appreciated.

Having now described my invention, what I claim as new, and desire to secure by Letters Patent, is—

1. A tire for the wheels of road-vehicles consisting of a rubber body part having separate chambers formed therein and continuously-open air-ducts leading from said chambers directly to the atmosphere, substantially as described.

2. A tire for the wheels of road-vehicles, consisting of a rubber body having separate chambers formed therein, continuously-open air-ducts leading from said chambers directly to the atmosphere, and grooves at the periphery of the tire, substantially as described.

3. A tire for the wheels of road-vehicles, consisting of a rubber body having separate chambers formed therein, continuously-open air-ducts leading from said chambers directly to the atmosphere, and grooves at the periphery of the tire, said grooves being disposed between the chambers, substantially as described.

4. A tire for the wheels of road-vehicles, consisting of a rubber body having separate chambers formed therein, continuously-open air-ducts leading from said chambers directly to the atmosphere, grooves at the periphery of the tire, said grooves being disposed between the chambers, and projections on the tire adapted to engage with gripping members on the felly of the wheel, substantially as described.

5. A tire for the wheels of road-vehicles, consisting of a rubber body part having separate spherical chambers formed therein, continuously-open air-ducts leading from said chambers directly to the atmosphere, concave transverse grooves formed in the periphery of the tire and disposed symmetrically between the spherical chambers, a flat tread-surface, projections adapted to engage with gripping members on the felly of the wheel substantially as described.

In witness whereof I have hereunto set my hand in presence of two witnesses.

ALFRED DUCASBLE.

Witnesses:
GUSTAVE CAMOIN,
HANSON C. COXE.